(12) United States Patent
Shimizu et al.

(10) Patent No.: US 11,432,467 B2
(45) Date of Patent: Sep. 6, 2022

(54) RECIPROCATING BLADE APPARATUS AND HANDHELD WORKING MACHINE

(71) Applicant: YAMABIKO CORPORATION, Tokyo (JP)

(72) Inventors: Kunio Shimizu, Tokyo (JP); Hisao Kodama, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 153 days.

(21) Appl. No.: 16/912,007

(22) Filed: Jun. 25, 2020

(65) Prior Publication Data
US 2020/0404857 A1    Dec. 31, 2020

(30) Foreign Application Priority Data

Jun. 28, 2019   (JP) .............................. JP2019-121825

(51) Int. Cl.
| | | |
|---|---|---|
| *A01G 3/053* | (2006.01) | |
| *A01G 3/047* | (2006.01) | |
| *A01G 3/04* | (2006.01) | |

(52) U.S. Cl.
CPC ............ *A01G 3/053* (2013.01); *A01G 3/047* (2013.01); *A01G 3/0475* (2013.01); *A01G 2003/0461* (2013.01)

(58) Field of Classification Search
CPC ........ A01G 3/04; A01G 3/047; A01G 3/0475; A01G 3/053; A01G 2003/0461; A01D 34/134; A01D 34/14; A01D 34/147

(Continued)

(56) References Cited

U.S. PATENT DOCUMENTS

| 5,426,856 A * | 6/1995 | Aiyama ................. A01G 3/053 30/208 |
|---|---|---|
| 5,987,753 A * | 11/1999 | Nagashima ............ A01G 3/053 30/216 |

(Continued)

FOREIGN PATENT DOCUMENTS

JP         2016_049082  A     4/2016

OTHER PUBLICATIONS

European Search Report in corresponding International Appln. No. 20182264.0 dated Nov. 12, 2020.

*Primary Examiner* — Jason Daniel Prone
(74) *Attorney, Agent, or Firm* — Bacon & Thomas, PLLC

(57) ABSTRACT

A reciprocating blade apparatus includes a pair of reciprocating blades stacked on one another in a thickness direction. Each of the blades includes a base as a flat plate extending in a longitudinal direction, and a plurality of teeth protruding in a direction intersecting the longitudinal direction. A transmission case of the reciprocating blade apparatus also includes a reciprocating member having a joint detachably coupled to the base, the reciprocating member being reciprocably supported in the longitudinal direction. A blade support member is attached to the transmission case and configured to sandwich bases of the pair of reciprocating blades therebetween to allow the pair of reciprocating blades to move in the longitudinal direction. The blade support member holds a space to accommodate the pair of reciprocating blades and is independently attached to the transmission case. The pair of reciprocating blades is detachably attached to the blade support member.

10 Claims, 5 Drawing Sheets

(58) Field of Classification Search
USPC .................................. 30/208–210, 215–222
See application file for complete search history.

(56) References Cited

U.S. PATENT DOCUMENTS

| | | | |
|---|---|---|---|
| 6,263,579 B1 | 7/2001 | Nagashima | |
| 6,910,276 B2* | 6/2005 | Huang | A01G 3/053 30/216 |
| 7,406,770 B2* | 8/2008 | Mace | A01D 34/14 30/216 |
| 7,752,760 B2* | 7/2010 | Baskar | A01G 3/053 30/210 |
| 7,757,405 B2* | 7/2010 | Peterson | A01G 3/053 30/220 |
| 7,788,811 B2* | 9/2010 | Hanada | A01G 3/053 30/216 |
| 8,028,423 B2* | 10/2011 | Matsuo | A01G 3/053 30/220 |
| 8,732,959 B2* | 5/2014 | Lugert | A01G 3/053 30/216 |
| 8,959,780 B2* | 2/2015 | Masalin | A01G 3/053 30/208 |
| 9,603,311 B2* | 3/2017 | Wang | A01G 3/053 |
| 9,610,700 B2* | 4/2017 | Hittmann | A01G 3/053 |
| 9,675,011 B2* | 6/2017 | Sergyeyenko | A01G 3/053 |
| 9,736,991 B2* | 8/2017 | Hanada | A01G 3/053 |
| 10,321,636 B2* | 6/2019 | Peterson | A01G 3/053 |
| 10,537,069 B2* | 1/2020 | Wykman | A01G 3/053 |
| 10,537,983 B2* | 1/2020 | Dyer | A01G 3/053 |
| 10,631,468 B2* | 4/2020 | Hansson | A01G 3/053 |
| 2010/0037469 A1* | 2/2010 | Chubb | A01G 3/053 30/216 |
| 2011/0179651 A1* | 7/2011 | Hittmann | A01G 3/053 30/216 |
| 2012/0017447 A1* | 1/2012 | Nie | A01G 3/053 30/228 |
| 2013/0326885 A1* | 12/2013 | Kaupp | A01G 3/053 30/208 |
| 2016/0007542 A1* | 1/2016 | Stones | A01G 3/053 30/216 |
| 2016/0330914 A1* | 11/2016 | Tang | A01G 3/053 |
| 2019/0357445 A1* | 11/2019 | McCue | A01G 3/053 |
| 2020/0045889 A1* | 2/2020 | Shimizu | A01G 3/053 |
| 2020/0404858 A1* | 12/2020 | Shimizu | A01G 3/053 |
| 2020/0406415 A1* | 12/2020 | Shimizu | A01G 3/053 |
| 2021/0015033 A1* | 1/2021 | Johnson | A01D 34/14 |
| 2021/0029887 A1* | 2/2021 | Shimizu | A01G 3/053 |

* cited by examiner

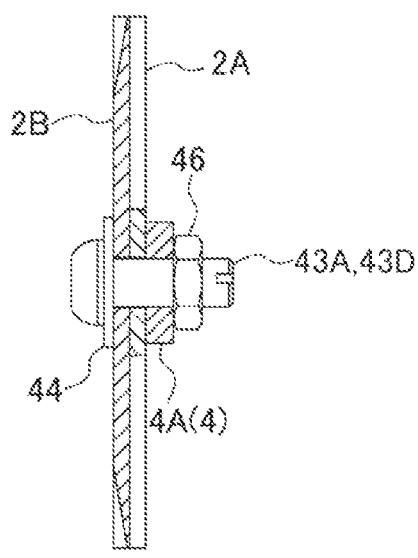 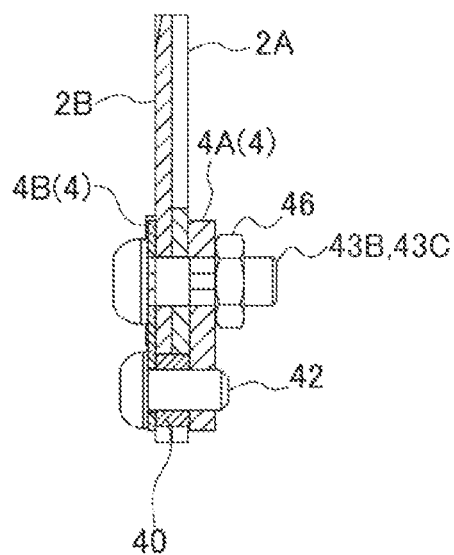
*FIG. 3A*   *FIG. 3B*

RECIPROCATING BLADE APPARATUS AND HANDHELD WORKING MACHINE

CROSS-REFERENCE TO RELATED APPLICATIONS

The present application claims priority from Japanese Patent Application No. 2019-121825 filed on Jun. 28, 2019, and the entire contents of which are hereby incorporated by reference.

BACKGROUND

1. Technical Field

The present invention relates to a reciprocating blade apparatus, and a handheld working machine equipped with the reciprocating blade apparatus.

2. Related Art

As a handheld working machine for cutting or clipping branches and leaves, there has been generally known a hedge trimmer equipped with a reciprocating blade apparatus having reciprocating blades, like a hair clipper. Meanwhile, as a handheld working machine for cutting grass on the ground, there has been generally known a brush cutter equipped with rotary blades or nylon cutters.

The handheld working machine for cutting branches and leaves is required to produce little scattering substances during the work, in order to ensure the safety of the worker and the surrounding of the worker, or to prevent the damage of other people's properties near the working site. The amount of scattering substances produced by the reciprocating blades during the work is less than those of the rotary blade and the nylon cutters which rotate at a high speed. With this advantage of the reciprocating blades, a working machine for cutting grass on the ground has been proposed, for example, in Japanese Unexamined Patent Application Publication No. 2016-49082 (hereinafter JP No. 2016-49082), which includes a reciprocating blade apparatus mounted to the top end of a handheld operating rod.

This reciprocating blade apparatus mounted to the top end of the operating rod includes blades extending in the direction intersecting the longitudinal direction of the operating rod. A drive source such as an engine and a motor is provided at the base end of the operating rod, and a drive force is transmitted to a power train in a transmission case of the reciprocating blade apparatus via a drive shaft provided in the operating rod. The power train in the transmission case converts the rotation of the drive shaft to reciprocating motion to operate the reciprocating blades coupled to the power train.

The reciprocating blade apparatus disclosed in JP No. 2016-49082, or provided for the hedge trimmer needs the maintenance and the replacement of the blades to repeatedly operate with good performance.

The reciprocating blades become blunt due to the repeated use, and therefore it is necessary to sharpen the blades to recover the sharpness of the edges. When the blades mounted to the apparatus are sharpened, it is necessary to move the blades during the intermission of the work, which is very troublesome. To solve this problem, it is preferred to remove the blades for the sharpening. However, it takes a lot of work and time to take apart the apparatus to remove the blades and assemble the apparatus again.

Moreover, when the blades of the reciprocating blade apparatus are no longer able to be used due to wear or damage, it is necessary to replace the blades. In this case, if it is necessary to take apart and assemble the apparatus to replace the blades, it also takes a lot of work and time.

To address this problem, although JP No. 2016-49082 approaches to improve the efficiency of the maintenance of the blades to be replaced, it is still necessary to take apart a part of the apparatus to detach the blades. Therefore, there is a demand to further improve the efficiency of the maintenance of the blades.

SUMMARY

To solve the above-described problem, it is desirable to provide a reciprocating blade apparatus capable of improving the efficiency of the maintenance of the blades, more specifically, capable of detaching and attaching the blades without taking apart the apparatus. By this means, it is possible to reduce the workload and the time to sharpen and replace the blades.

An aspect of the present invention provides a reciprocating blade apparatus including: a pair of reciprocating blades stacked on one another in a thickness direction, each of which includes a base as a flat plate extending in a longitudinal direction, and a plurality of teeth protruding in a direction intersecting the longitudinal direction; a transmission case including a reciprocating member having a joint detachably coupled to the base, the reciprocating member being reciprocably supported in the longitudinal direction; and a blade support member attached to the transmission case and configured to sandwich bases of the pair of reciprocating blades therebetween to allow the pair of reciprocating blades to move in the longitudinal direction. The blade support member holds a space to accommodate the pair of reciprocating blades and is independently attached to the transmission case. The pair of reciprocating blades is detachably attached to the blade support member.

According to the present invention, it is possible to detach and attach a pair of reciprocating blades from and to a blade support member without taking apart the reciprocating blade apparatus, and therefore to improve the efficiency of the maintenance and the replacement of the blades. Moreover, the pair of reciprocating blades can be detached from and attached to the reciprocating blade apparatus without taking apart the apparatus, and therefore it is possible to reduce the workload and the time to sharpen and replace the blades.

BRIEF DESCRIPTION OF THE DRAWINGS

FIG. 3A is a cross-sectional view illustrating adjustment screws 43A and 43D;

FIG. 3B is a cross-sectional view illustrating adjustment screws 43B and 43C;

DETAILED DESCRIPTION

Hereinafter, an embodiment of the present invention will be described with reference to the drawings. The same reference numbers in the different drawings indicate the same functional parts, and therefore repeated description for each of the drawings is omitted.

Figure 1:
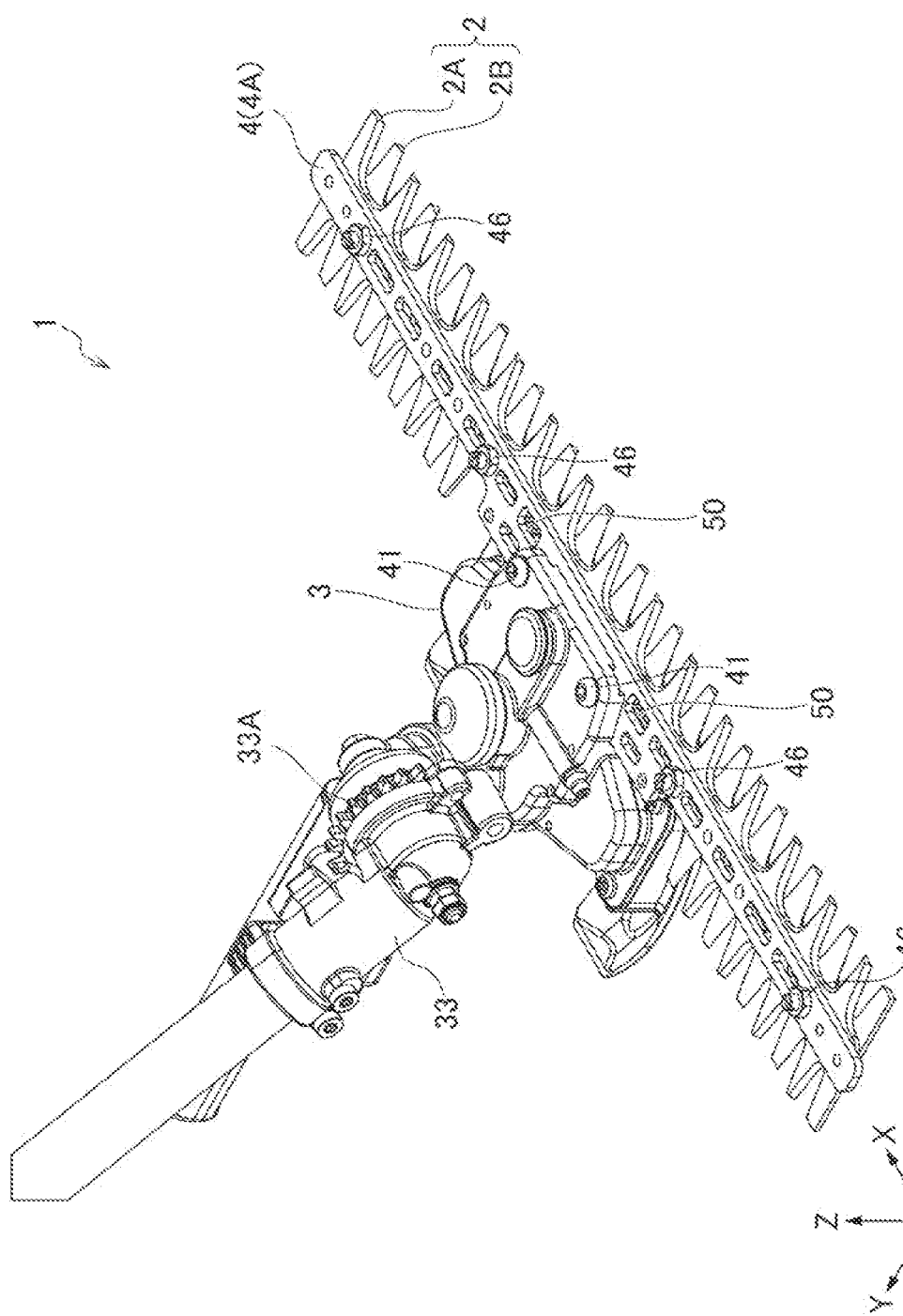
FIG. 1 is a perspective view illustrating the external appearance of a reciprocating blade apparatus according to an embodiment of the present invention.
Figure 2:
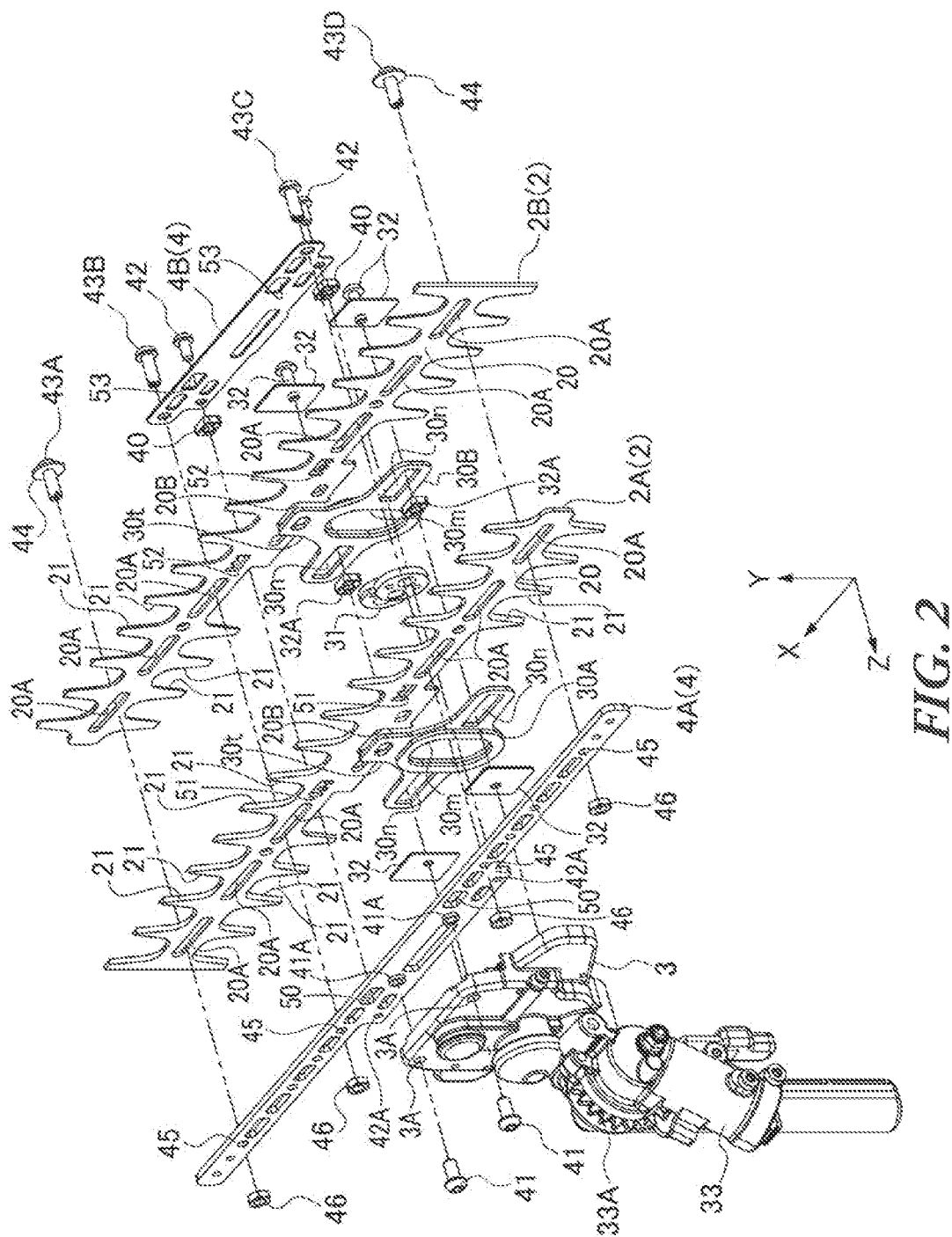
FIG. 2 is an exploded perspective view illustrating the reciprocating blade apparatus according to an embodiment of the present invention.

As illustrated in FIGS. 1 and 2, a reciprocating blade apparatus 1 includes a pair of reciprocating blades 2 (hereinafter referred to as "blade member"), a transmission case 3, and a blade support member 4. The reciprocating blade apparatus 1 is configured to cut and mow plants and so forth by sliding and reciprocating the blade member 2 relative to one another.

The blade member 2 includes two blades 2A and 2B made of metal plates which are stacked in the thickness direction (Z direction in the drawings). Each of the blades 2A and 2B of the blade member 2 includes a base 20 as a flat plate extending in the longitudinal direction (X direction in the drawings) and a plurality of teeth 21 protruding in the direction (Y direction in the drawings) intersecting the longitudinal direction.

The base 20 of each of the blades 2A and 2B is supported by the blade support member 4, and includes a plurality of long holes 20A formed along the longitudinal direction (X direction in the drawings) of the blade member 2. Adjustment screws described later as fastening members penetrate the long holes 20A.

The teeth 21 may be provided in both sides of each of the blades 2A and 2B in Y direction as illustrated, or provided in one side. These teeth 21 are like comb-like blades of a hair clipper. The two blades 2A and 2B slide relative to one another in the longitudinal direction to cut the plants between the teeth 21 of the blades 2A and 2B.

The transmission case 3 includes a power train to reciprocate the blade member 2. The power train is configured to convert the rotation of a drive shaft (not illustrated) to reciprocating motion, and includes reciprocating members 30A and 30B such as connecting rods which are reciprocably supported in the longitudinal direction (X direction in the drawings) of the blade member 2, and a cam 31.

The reciprocating members 30A and 30B include joints 30t to connect to the bases 20 of the blades 2A and 2B, respectively. Each of the joints 30t includes a convex portion protruding in the direction (Y direction in the drawings) orthogonal to the longitudinal direction of the blade member 2. Meanwhile, a concave portion 20B is formed in the base 20 to engage with the convex portion of the joint 30t.

As illustrated in FIG. 2, each of the reciprocating members 30A and 30B includes a fitting hole 30m in which the cam 31 is fitted, and guide holes 30n in which guide pieces 32A of the support members 32 are fitted to support the reciprocating members 30A and 30B by the transmission case 3. The guide holes 30n are provided on the right and left sides of the fitting hole 30m along X direction in FIG. 2.

The blade support member 4 is attached to the transmission case 3, and sandwiches the bases 20 of the pair of blades 2A and 2B therebetween to allow the blade member 2 to move in the longitudinal direction (X direction in the drawings). As illustrated in FIG. 2, the blade support member 4 includes a pair of support plates (upper support plate 4A and lower support plate 4B) extending in the longitudinal direction (X direction) of the blade member 2.

The upper support plate 4A and the lower support plate 4B of the blade support member 4 are fastened via spacers 40 to make a space to accommodate the blades member 2. The upper support plate 4A and the lower support plate 4B are individually attached to the transmission case 3 while keeping the space. The blade member 2 is accommodated in the space and detachably attached to the blade support member 4.

Hereinafter, the configuration where the blade member 2 is fastened and supported by the blade support member 4 will be described in detail with reference to FIG. 2. First, attachment screws 41 are screwed into screw holes 41A of the upper support plate 4A via holes 3A of the transmission case 3 to independently attach the upper support plate 4A of the blade support member 4 to the transmission case 3. Meanwhile, the upper support plate 4A and the lower support plate 4B are fastened by fastening screws 42 at fastening points 42A without interfering with the blade member 2. The fastening screws 42 penetrate the holes of the lower support plate 4B and the spacers 40, and are screwed into the fastening points 42A of the upper support plate 4A. By this means, the upper support plate 4A and the lower support plate 4B are fastened while keeping the space for the thickness of the spacers 40, and attached to the transmission case 3. In this case, the upper support plate 4A and the lower support plate 4B are coupled to one another by the fastening screws 42 via the spacers 40, and the fastened portion serves as a joint of bamboo. By this means, it is possible to improve the rigidity of the blade member 2 and the blade support member 4 while reducing the weight.

The pair of blades 2A and 2B sandwiched between the upper support plate 4A and the lower support plate 4B is reciprocably supported by the blade support member 4 with the adjustment screws 43A, 43B, 43C and 43D at points different from the fastening points 42A. Here, the two adjustment screws 43A and 43D of the four adjustment screws 43 are inserted into washers 44 and screwed into screw holes 45 of the upper support plate 4A via the long holes 20A of the blade member 2, and fixed by fixing nuts 46. In addition, the other two adjustment screws 43B and 43C are inserted into the holes of the lower support plate 4B, and screwed into the screw holes 45 of the upper support plate 4A via the long holes 20A of the blade member 2, and fixed by the fixing nuts 46.

In this case, as illustrated in FIG. 3A, the distance between the washer 44 and the upper support plate 4A is adjusted by the adjustment screws 43A and 43D, and therefore it is possible to adjust the distance between the two blades 2A and 2B sandwiched between the washer 44 and the upper support plate 4A. In addition, as illustrated in FIG. 3B, the distance between the upper support plate 4A and the lower support plate 4B is adjusted by the adjustment screws 43B and 43D, and therefore it is possible to adjust the distance between the two blades 2A and 2B sandwiched between the upper support plate 4A and the lower support plate 4B.

The blade member 2 is supported by the upper support plate 4A with the adjustment screws 43A to 43D at the positions different from those of the screw holes 41A in which the attachment screws 41 are inserted to attach the upper support plate 4A to the transmission case 3. By this means, it is possible to detach the blade member 2 simply by removing the adjustment screws 43A to 43D while the blade support member 4 remains attached to the transmission case 3.

Although there are the spacers 40 between the upper support plate 4A and the lower support plate 4B, the adjustment screws 43B and 43C are provided at positions different from the fastening points 42A at which the upper support plate 4A and the lower support plate 4B are fastened via the spacers 40. Therefore, it is possible to adjust the distance between the upper support plate 4A and the lower support plate 4B by fastening the adjustment screws 43B and 43C to elastically deform the upper support plate 4A and the lower support plate 4B.

The adjustment of the distance between the two blades 2A and 2B is important to maintain the sharpness of the blade member 2. The ware of the bases 20 and the upper and lower support plates 4A and 4B as well as the teeth 21 due to repeated use increases the distance between the blades 2A and 2B, and therefore loses the sharpness. To recover the sharpness, maintenance needs to adequately adjust the distance between the blades 2A and 2B by the adjustment screws 43.

Figure 4:
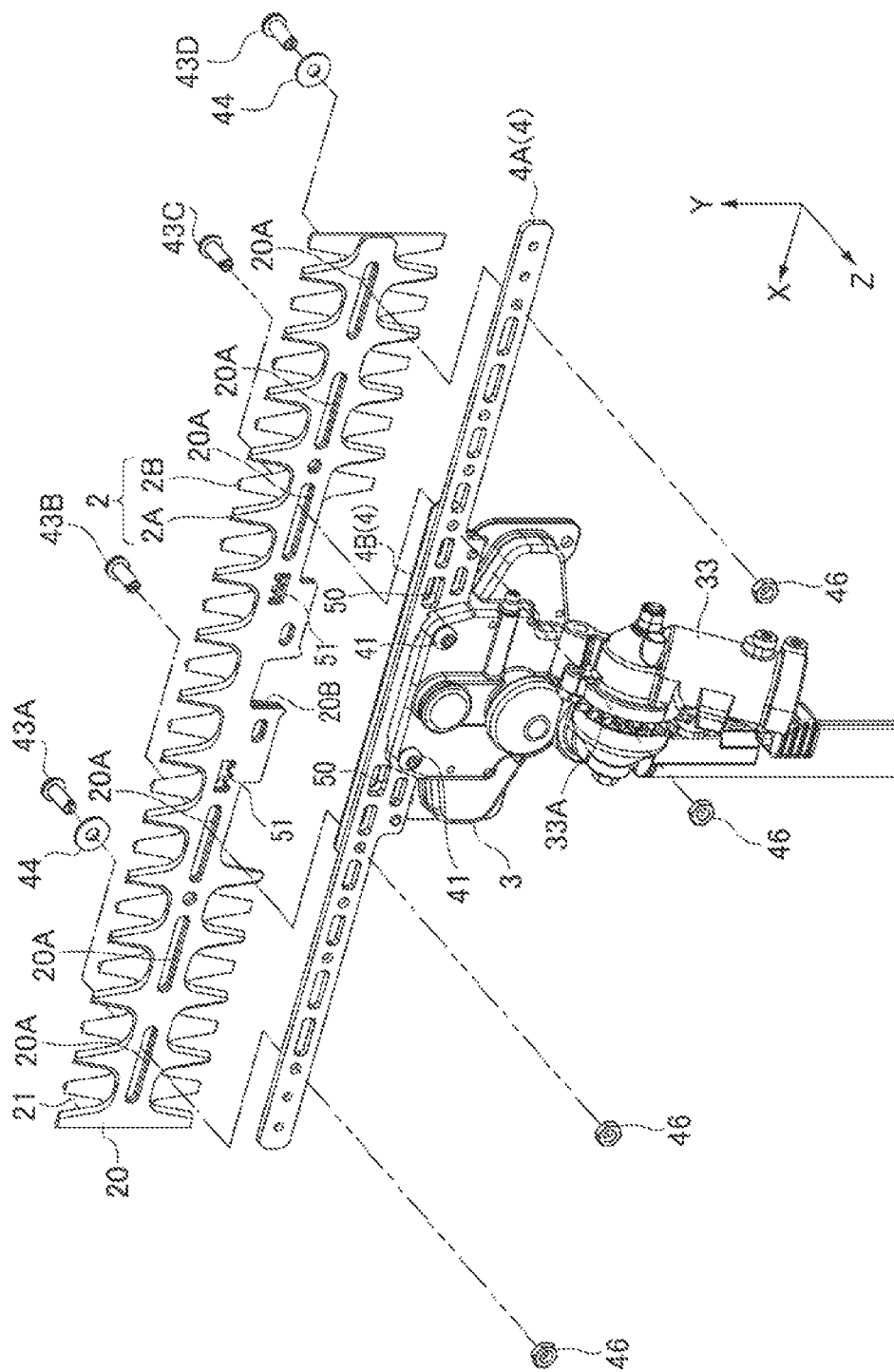
FIG. 4 illustrates the detachment of the blades.

As illustrated in FIG. 4, the blade member 2 is easily detached and attached by removing the adjustment screws 43A to 43D without taking apart the reciprocating blade apparatus 1. That is, the blade member 2 can be free from the upper support plate 4A and the lower support plate 4B of the blade support member 4 simply by removing the fixing nuts 46 from the adjustment screws 43A to 43D and also removing the adjustment screws 43A to 43D from the screw holes 45 of the upper support plate 4A to pull out the adjustment screws 43A to 43D. As illustrated, the adjustment screws 43A to 43D are arranged in a line different from the fastening screws 42 to prevent a mistake of the screws when the blade member 2 is detached from the reciprocating blade apparatus 1.

The blade member 2 is coupled to the power train in the transmission case 3 simply by coupling the joints 30t of the reciprocating members 30A and 30B to the bases 20 of the blade member 2, and engaging the convex portions of the joints 30t protruding in Y direction with the concave portions 20B of the bases 20 caving in Y direction. Therefore, it is possible to easily detach the blade member 2 from the transmission case 3 and the blade support member 4 by pulling out the blade member 2 in Y direction.

As illustrated in FIG. 4, the blade member 2 can be detached while the upper support plate 4A and the lower support plate 4B of the blade support member 4 remain attached to the transmission case 3. Therefore, after the blade member 2 is detached, the distance between the upper support plate 4A and the lower support plate 4B is kept in the state just before the blade member 2 is detached where the upper support plate 4A and the lower support plate 4B are fastened via the spacers 40. By this means, the blade member 2 can be attached again by simply inserting the blade member 2 between the upper support plate 4A and the lower support plate 4B and fastening them with the adjustment screws 43. As illustrated, the long holes 20A of the base 20 meet the screw holes 45 of the upper support plate 4A while the lower ends of the blades 2A and 2B contact spacers 40, and therefore it is possible to easily align the long holes 20A with the screw holes 45.

Here, in a case where the concave portion 20B is provided near the center of each of the bases 20 in the longitudinal direction, the concave portion 20B can be easily engaged with the convex portion of respective joints 30t of the reciprocating members 30A and 30B simply by aligning approximately the center of the base 20 with approximately the center of the blade support member 4. By this means, it is possible to readily couple the blade member 2 to the power train. Meanwhile, even in a case where the concave portion 20B is not provided near the center of the base 20, the joints 30t of the reciprocating members 30A and 30B can be seen between the upper support plate 4A and the lower support plate 4B, and therefore it is possible to easily engage the joint 30t with the concave portion 20B of the base 20, watching the convex portion of the joint 30t.

In addition, in a case where the blade member 2 is detached from the blade support member 4, when the joint 30t of the reciprocating member 30A engaged with the concave portion 20B of the blade 2A overlaps the joint 30t of the reciprocating member 30B engaged with the concave portion 20B of the blade 2B, it is easy not only to detach the blade member 2 but also to attach the blade member 2. However, when the blades 2A and 2B are stopped during the reciprocating motion of them, the concave portions 20B of the blades 2A and 2B are not aligned with one another, and also the joints 30t are not aligned with one another.

Therefore, alignment holes 50 of the upper support plate 4A, alignment holes 51 of the blade 2A, alignment holes 52 of the blade 2B, and alignment holes 53 of the lower support plate 4B are provided to align the blades 2A and 2B with one another when the blade member 2 is stopped. After the blade member 2 is stopped, the blades 2A and 2B can be aligned with one another by inserting a tool such as a flat-blade screwdriver into the alignment holes 50 to 53, it is possible to align the concave portions 20B of the blades 2A and 2B with one another before the blade member 2 is detached from the blade support member 4. By this means, it is possible to overlap the joints 30t engaged with the concave portions 20B with one other. This alignment makes it easy to attach and detach the blade member 2 to and from the blade support member 4. In order to check the alignment, a plurality of holes are formed in the upper support plate 4A and the blades 2A and 2B, which overlap with each other when the alignment is successfully done.

In this way, even when the blade member 2 becomes blunt due to repeated use, only the blade member 2 can be easily detached from the reciprocating blade apparatus 1, and therefore it is possible to sharpen the blade member 2 without taking a lot of work and time. In addition, even when the blade member 2 is no longer able to be used due to the wear or damage, the blade member 2 can be easily replaced by detaching and attaching the adjustment screws 43A to 43D by the worker without taking a lot of work and time, and therefore the reciprocate blade apparatus 1 can continue the work using the new blade member 2.

Figure 5:
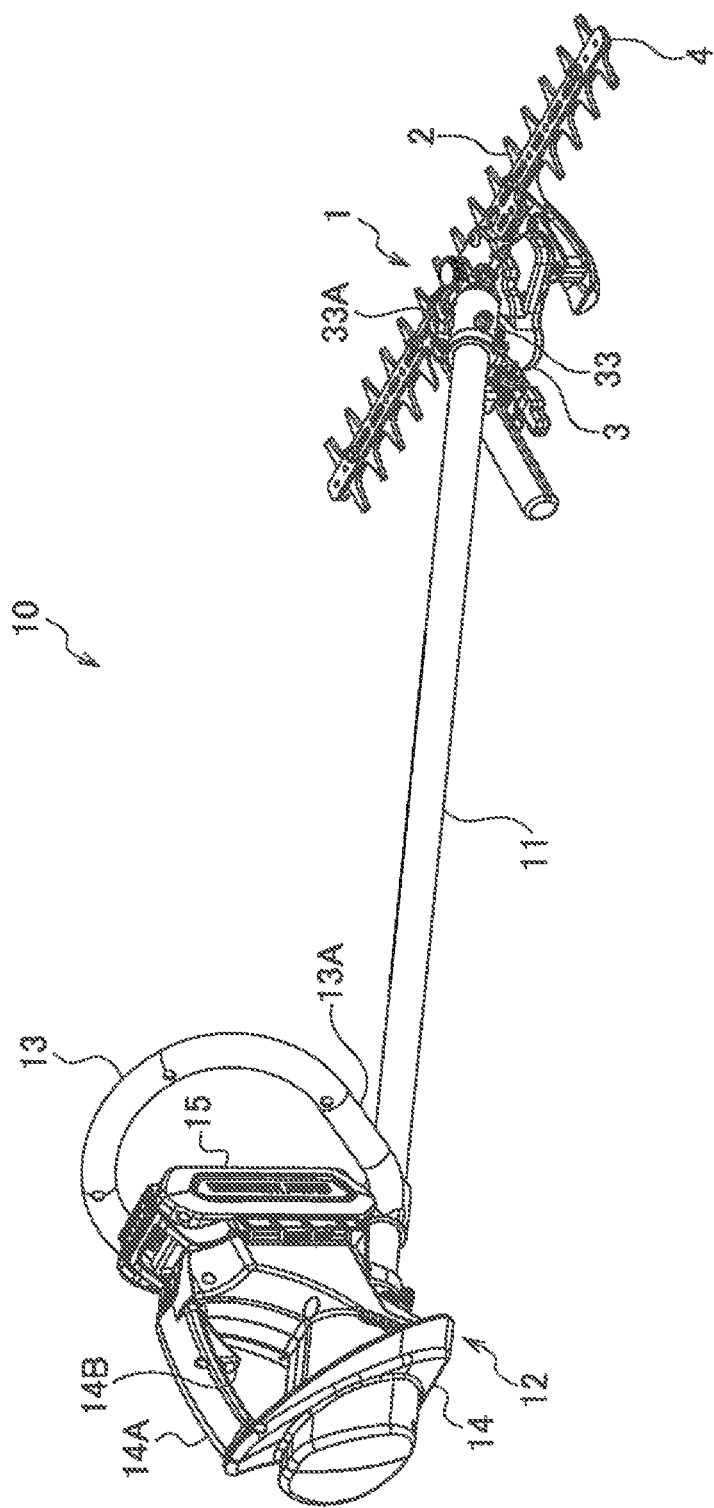
FIG. 5 illustrates a handheld working machine equipped with the reciprocating blade apparatus.

FIG. 5 illustrates an example of handheld working machine including the reciprocating blade apparatus 1. As illustrated in FIG. 5, a handheld working machine 10 includes an operating rod 11, and the top end of the operating rod 11 is mounted to an operating rod mount 33 of the transmission case 3. The operating rod mount 33 is mounted to the transmission case 3 via an angle adjustment mechanism 33A. The angle adjustment mechanism 33A can adjust the rising angle of the operating rod 11 from the working surface of the blade member 2.

A drive shaft (not illustrated) configured to transmit a drive force to the power train is provided in the operating rod 11. In addition, a drive unit 12 configured to drive the drive shaft is provided at the base end of the operating rod 11, and an operating handle 13 is provided in the base end side of the operating rod 11. The operating handle 13 includes a grip 13A above the operating rod 11.

The drive unit 12 is configured to drive the reciprocating blade apparatus 1 via the drive shaft in the operating rod 11, and includes a housing 14 to accommodate a motor disposed approximately coaxially with the operating rod 11. A rear handle 14A including an operating switch 14B configured to turn on and off the reciprocating blade apparatus 1 is provided in the housing 14. A buttery unit 15 configured to supply electric power to the motor in the housing 14 is externally attached to the housing 14.

This handheld working machine 10 is an electric brush cutter equipped with the reciprocating blade apparatus 1. The longitudinal direction of the blade member 2 intersects the longitudinal direction of the operating rod 11, and therefore the reciprocating blade apparatus 1 is provided at the top end of the operating rod 11 to forma T-shape. This handheld working machine 10 performs brush cutting by driving the reciprocating blade apparatus 1 to move the reciprocating blade apparatus 1 along the ground while the worker holds the operating handle 13 and the rear handle 14A of the housing 14 by the hands to keep a predetermined rising angle of the operating rod 11 from the ground.

With this handheld working machine 10, the width of the blade member 2 of the reciprocating blade apparatus 1 is the effective width, and therefore the worker simply pushes the operating rod 11 without shaking the operating rod 11 from side to side, and consequently it is possible to do the brush cutting with the effective width. Therefore, it is possible to perform the brush cutting by speedily moving the reciprocating blade apparatus 1 forward, and consequently to improve the efficiency of the brush cutting. Moreover, the reciprocating blades are used, and therefore it is possible to reduce the scattering substances during the brush cutting. By this means, it is possible to ensure the safety of the worker and the surrounding of the worker, and prevent the damage of other people's properties near the working site during the brush cutting.

Moreover, with the handheld working machine 10, it is possible to reduce the workload and the working time to sharpen and replace the blade member 2, and consequently to improve the efficiency of the maintenance for repeated works.

As described above, the embodiments of the present invention have been described in detail with reference to the drawings. However, the specific configuration is not limited to the embodiments, and the design can be changed without departing from the scope of the present invention.

In addition, the above-described embodiments can be combined by utilizing each other's technology as long as there is no particular contradiction or problem in the purpose and configuration.

The invention claimed is:

1. A reciprocating blade apparatus comprising:
   a pair of reciprocating blades stacked on one another in a thickness direction, each of the blades including:
      bases shaped like a flat plate extending in a longitudinal direction; and
      a plurality of teeth protruding in a direction intersecting the longitudinal direction;
   a transmission case including a pair of reciprocating members, each of the reciprocating members having a joint detachably coupled to each of the bases, the reciprocating members being supported by the transmission case in a state where the reciprocating members are able to reciprocate in the longitudinal direction; and
   a pair of blade support members attached to the transmission case and configured to sandwich the bases of the pair of reciprocating blades therebetween to allow the pair of reciprocating blades to move in the longitudinal direction, wherein:
   the blade support members hold a space to accommodate the pair of reciprocating blades; and
   the pair of reciprocating blades is detachably attached to the blade support members while the blade support members remain attached to the transmission case.

2. The reciprocating blade apparatus according to claim 1, wherein:
   each of the blade support members includes a support plate extending in the longitudinal direction;
   the support plates are fastened at fastening points, and spacers configured to hold the space are sandwiched between the support plates; and
   the pair of reciprocating blades is supported by an adjustment screw fixed to the pair of support plates at positions different from the fastening points, the adjustment screw being inserted into elongated holes formed in the bases.

3. The reciprocating blade apparatus according to claim 2, wherein:
   the adjustment screws are configured to adjust a gap between the pair of reciprocating blades; and
   the pair of reciprocating blades can be detached from the blade support member by removing the adjustment screws.

4. The reciprocating blade apparatus according to claim 1, wherein:
   each of the joints includes a convex portion protruding in a direction intersecting the longitudinal direction; and
   each of the bases includes a concave portion to engage with the convex portion of the joint.

5. The reciprocating blade apparatus according to claim 4, wherein the concave portion is formed near a center of each of the bases in the longitudinal direction.

6. A handheld working machine including a reciprocating blade apparatus, the reciprocating blade apparatus including:
   a pair of reciprocating blades stacked on one another in a thickness direction, each of the blades including:
      a base shaped like a flat plate extending in a longitudinal direction; and
      a plurality of teeth protruding in a direction intersecting the longitudinal direction;
   a transmission case including a pair of reciprocating members, each of the reciprocating members having a joint detachably coupled to each of the bases, the reciprocating members being supported by the transmission case in a state where the reciprocating members are able to reciprocate in the longitudinal direction; and
   a pair of blade support members attached to the transmission case and configured to sandwich the bases of the pair of reciprocating blades therebetween to allow the pair of reciprocating blades to move in the longitudinal direction, wherein:
   the blade support members hold a space to accommodate the pair of reciprocating blades so that the blades are sandwiched by the blade support members; and
   the pair of reciprocating blades is detachably attached to the blade support members while the blade support members remain attached to the transmission case,
   the handheld working machine comprising:
   an operating rod having a first end to which the transmission case is mounted; and
   a drive unit provided at a second end of the operating rod and configured to drive the pair of reciprocating blades,
   wherein the longitudinal direction of the pair of reciprocating blades intersects a longitudinal direction of the operating rod.

7. The handheld working machine according to claim 6, wherein:
   each of the blade support members includes a support plate extending in the longitudinal direction;
   the support plates are fastened at fastening points, and spacers configured to hold the space are sandwiched between the support plates; and
   the pair of reciprocating blades is supported by an adjustment screw fixed to the pair of support plates at positions different from the fastening points, the adjustment screw being inserted into elongated holes formed in the bases.

8. The handheld working machine according to claim 7, wherein:
   the adjustment screws are configured to adjust a gap between the pair of reciprocating blades; and
   the pair of reciprocating blades can be detached from the blade support member by removing the adjustment screws.

9. The handheld working machine according to claim 6, wherein:
   each of the joints includes a convex portion protruding in a direction intersecting the longitudinal direction; and
   each of the bases includes a concave portion to engage with the convex portion of the joint.

10. The handheld working machine according to claim 9, wherein the concave portion is formed near a center of each of the bases in the longitudinal direction.

\* \* \* \* \*